(12) United States Patent
Kim

(10) Patent No.: US 8,185,172 B2
(45) Date of Patent: *May 22, 2012

(54) SWING TYPE COVER OPENING AND CLOSING DEVICE FOR MOBILE PHONE

(75) Inventor: Yong-Yeon Kim, Gyeonggi-do (KR)

(73) Assignee: Prexco Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/002,481

(22) PCT Filed: Sep. 1, 2008

(86) PCT No.: PCT/KR2008/005120
§ 371 (c)(1),
(2), (4) Date: Jan. 3, 2011

(87) PCT Pub. No.: WO2010/002065
PCT Pub. Date: Jan. 7, 2010

(65) Prior Publication Data
US 2011/0111812 A1    May 12, 2011

(30) Foreign Application Priority Data
Jul. 4, 2008  (KR) .................. 10-2008-0065087

(51) Int. Cl.
*H04M 1/00* (2006.01)
(52) U.S. Cl. .................. 455/575.3; 455/575.1
(58) Field of Classification Search ............... 455/575.3, 455/575.1
See application file for complete search history.

(56) References Cited

U.S. PATENT DOCUMENTS
7,231,188 B2   6/2007  Godston et al.
(Continued)

FOREIGN PATENT DOCUMENTS
EP        1777924 A1     4/2007
(Continued)

OTHER PUBLICATIONS

"International Application Serial No. PCT/KR2008/005120, International Search Report mailed Apr. 3, 2009", 3 pgs.

(Continued)

*Primary Examiner* — Charles Shedrick
(74) *Attorney, Agent, or Firm* — Schwegman, Lundberg & Woessner, P.A.

(57) ABSTRACT

According to an exemplary embodiment of the invention, a swing-type cover opening and closing device for a mobile phone, in which in which the mobile phone that is composed of a main body and a cover and where a hollow shaft formed in the cover is pivotably supported on the main body to pivot the cover in a clockwise or counterclockwise direction around the hollow shaft, includes: i) a fixation plate that is fixed to one side of the main body in correspondence with the hollow shaft, and includes a through-hole through which the hollow shaft passes and a ring-shaped protrusion integrally formed on the periphery of the through-hole; ii) a rotating body that has a disk shape with a hollow space, is pivotably joined to the ring-shaped protrusion, and is locked to the cover with the hollow shaft fitting in the hollow space; iii) a cover member that includes a support hole corresponding to the hollow space and is joined to the fixation plate while supporting the outer periphery of the rotating body through the support hole; and iv) an elastic unit of which both ends are pivotably joined to the fixation plate and the rotating body, respectively, to provide elastic force to the rotating body by rotation of the rotating body through the cover.

13 Claims, 7 Drawing Sheets

U.S. PATENT DOCUMENTS

| | | | |
|---|---|---|---|
| 7,419,099 B2 * | 9/2008 | Lee et al. | 235/472.01 |
| 7,866,000 B2 * | 1/2011 | Lee et al. | 16/334 |
| 2005/0202856 A1 * | 9/2005 | Park et al. | 455/575.1 |
| 2011/0105202 A1 | 5/2011 | Kim | |

FOREIGN PATENT DOCUMENTS

| | | |
|---|---|---|
| JP | 2005-121095 A | 5/2005 |
| JP | 2005-534237 A | 11/2005 |
| KR | 20-0387277 Y1 | 6/2005 |
| KR | 10-2006-0004447 B1 | 1/2006 |
| KR | 20-0408523 Y1 | 2/2006 |
| KR | 10-2006-0033298 A | 4/2006 |
| KR | 10-2006-0054605 A | 5/2006 |
| KR | 20-0416846 Y1 | 5/2006 |
| KR | 20-0419184 Y1 | 6/2006 |
| KR | 10-0699245 B1 | 3/2007 |
| KR | 10-0761663 B1 | 9/2007 |
| KR | 10-0768499 B1 | 10/2007 |
| KR | 10-0796725 B1 | 1/2008 |

OTHER PUBLICATIONS

"International Application Serial No. PCT/KR2008/005120, Written Opinion mailed Apr. 3, 2009", 4 pgs.

"U.S. Appl. No. 13/002,472, Non Final Office Action mailed Oct. 11, 2011", 6 pgs.

"Application Serial No. PCT/KR2008/005121, International Search Report mailed Mar. 25, 2009", 3 pgs.

"Application Serial No. PCT/KR2008/005121, Written Opinion mailed Mar. 25, 2009", 3 pgs.

"Korean Application Serial No. 10-2008-0065087, Office Action mailed May 10, 2010", (w/ English Translation), 2 pgs.

"Korean Application Serial No. 10-2008-0065087, Response to Office Action mailed May 10, 2010", (English Translation), 2 pgs.

"Korean Application Serial No. 10-2008-0065089, Office Action mailed May 10, 2010", (English Translation), 2 pgs.

"Korean Application Serial No. 10-2008-0065089, Response filed to Office Action mailed May 10, 2010", (English translation), 2 pgs.

* cited by examiner

SWING TYPE COVER OPENING AND CLOSING DEVICE FOR MOBILE PHONE

CROSS REFERENCE TO RELATED APPLICATION

This application is a nationalization under 35 U.S.C. 371 of PCT/KR2008/005120, filed Sep. 1, 2008 and published as WO 2010/002065 A1 on Jan. 7, 2010, which application claims priority to and the benefit of Korean Patent Application No. 10-2008-0065087, filed Jul. 4, 2008, which applications and publication are incorporated herein by reference in their entirety.

BACKGROUND OF THE INVENTION (a) Field of the Invention

An exemplary embodiment of the present invention relate to a swing-type cover opening and closing device for a mobile phone. More particularly, an exemplary embodiment of the present invention relate to a swing-type cover opening and closing device for a mobile phone that can pivot a cover of the mobile phone in a semi-automated mode in a clockwise or counterclockwise direction.

(b) Description of the Related Art

Generally, portable terminals such as a mobile phone, a PDA, a notebook, a DMB phone, and the like are widely used in order to wirelessly use services such as communications and broadcasting in motion rather than at a fixed position.

The portable terminals are one kind of important necessities for obtaining convenience of life in the information age. In particular, mobile phones have come into wide use by elementary, middle, and high school students, and the aged.

As described above, as the demand and the number of users for portable terminals rapidly increases, consumers who uses them continue to expect products with new designs and new functions.

The portable terminal includes a main body with a keypad and a cover including a liquid crystal display that are joined to each other to be openable and closable. In general, the portable terminal may be classified as a folder-type portable terminal, a hinge-type portable terminal, a sliding-type portable terminal, and a swing-type portable terminal.

Further, as digital multimedia broadcasting (DMB) services have been recently commercialized, a swing-type cover opening and closing device having a structure in which the cover is opened to the main body while being pivoted by a swing device formed between the main body and the cover in case of pivoting the cover to the main body at a predetermined angle so as to easily watch multimedia such as photographs and motion pictures has been largely popular with consumers.

However, as most swing-type cover opening and closing devices for the mobile phone in the related art is configured to open and close the cover in a semi-automated mode, due to a problem in that the size and thickness of a product, and the number of components increases, the miniaturization and slimness of the mobile phone are hindered. Therefore, a technology development is keenly required to solve the above-described problem.

Particularly, since the cover opening and closing device for the mobile phone in the related art generally has a structure in which the cover is opened and closed in the semi-automated mode by adopting a cam of a surface contact mode and an elastic member, an overall structure of the cover opening and closing device for the mobile phone is complicated, and opening and closing operations of the cover by the surface contact of the cam are not stable.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a swing-type cover opening and closing device for a mobile phone having advantages in that a cover thereof is smoothly and stably opened and closed, durability is improved, and slimness and weight reduction of the mobile phone can be implemented in a simple structure.

An exemplary embodiment of the present invention provides a swing-type cover opening and closing device for a mobile phone, wherein the mobile phone is composed of a main body and a cover and wherein a hollow shaft formed in the cover is pivotally supported on the main body to pivot the cover in a clockwise or counterclockwise direction around the hollow shaft, that includes: i) a fixation plate that is fixed to one side of the main body in correspondence with the hollow shaft, and includes a through-hole through which the hollow shaft passes and a ring-shaped protrusion integrally formed on the periphery of the through-hole; ii) a rotating body that has a disk shape with a hollow space, is pivotally joined to the ring-shaped protrusion, and is locked to the cover with the hollow space shaft fitting in the hollow space; iii) a cover member that includes a support hole corresponding to the hollow space and is joined to the fixation plate while supporting the outer periphery of the rotating body through the support hole; and iv) an elastic unit of which both ends are pivotably joined to the fixation plate and the rotating body, respectively, to provide elastic force to the rotating body by rotation of the rotating body through the cover.

In the swing-type cover opening and closing device for the mobile phone, a plurality of locking portions to which a locking member passing through the cover can be locked are formed on the top surface of the rotating body, and a joining groove joined to the ring-shaped protrusion is formed on the bottom surface of the rotating body.

In the swing-type cover opening and closing device for the mobile phone, the rotating body includes a support protrusion that substantially supports the inner peripheral surface of the ring-shaped protrusion.

In this case, the support protrusion is composed of an inner wall of the joining groove and has a width that is larger than a depth of the joining groove.

In the swing-type cover opening and closing device for the mobile phone, a circular rail part forming a trajectory of 90 degrees or more in correspondence with the rotating body is formed on the fixation plate, and projections are formed at both ends of the rail part, respectively.

In the swing-type cover opening and closing device for the mobile phone, a protrusion-shaped stopper sliding on the rail part is integrally formed on the bottom surface of the rotating body.

In the swing-type cover opening and closing device for the mobile phone, the cover member is joined to the fixation plate through the locking member, and at least one hook for reinforcing joining force to the fixation plate is formed on the periphery of the cover member.

In the swing-type cover opening and closing device for the mobile phone, a hook protrusion joined to the hook in correspondence with the hook is formed on the periphery of the fixation plate.

In the swing-type cover opening and closing device for the mobile phone, the elastic unit includes: a housing that is pivotably installed on the fixation plate through a hinge pin; a slide member that is pivotably connected to the bottom surface of the rotating body and is joined to the inside of the housing to be slidable and lockable; and a plurality of spring members that are installed in the housing to apply the elastic force to the slide member.

In the swing-type cover opening and closing device for the mobile phone, a mounting hole corresponding to a pivot trajectory of the housing is formed on the fixation plate to penetrate therethrough.

In the swing-type cover opening and closing device for the mobile phone, the fixation plate further includes an auxiliary stopper for controlling a predetermined pivot angle of the rotating body.

In this case, the auxiliary stopper is composed of both hole ends of the mounting hole.

In the swing-type cover opening and closing device for the mobile phone, the housing has a plate shape, a plurality of spring mounting grooves for mounting the spring members are successively formed in a width direction, a guide groove is joined to the slide member while being connected to the spring mounting grooves, and slit-shaped locking holes connected to the guide grooves are formed at both sides of the guide grooves.

In the swing-type cover opening and closing device for the mobile phone, the slide member has the plate shape to fit in the guide groove and integrally includes a pair of support pins that fit in the spring member mounted on the spring mounting grooves at both sides of the housing.

In this case, a locking protrusion joined to the locking hole is formed in each support pin.

In the swing-type cover opening and closing device for the mobile phone, a hinge protrusion that is hinge-joined to the slide member is formed on the bottom surface of the rotating body.

In the swing-type cover opening and closing device for the mobile phone, a hinge hole joined to the hinge protrusion is formed in the slide member.

In the swing-type cover opening and closing device for the mobile phone, the hinge hole for joining the hinge pin is formed in the housing.

In the swing-type cover opening and closing device for the mobile phone, the swing-type cover opening and closing device is installed in the mobile phone that includes the main body and the cover that have a square shape, and is mounted at edges of the main body and the cover between the main body and the cover, and the rotating body forms a pivot trajectory of 90 degrees to pivot the cover by 180 degrees in the clockwise or counterclockwise direction.

BRIEF DESCRIPTION OF THE DRAWINGS

The accompanying drawings are referenced to describe exemplary embodiments of the present invention. Therefore, the technical spirit of the present invention should not be analyzed only on the basis of the accompanying drawings.

DETAILED DESCRIPTION OF THE EMBODIMENTS

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

Figure 1:
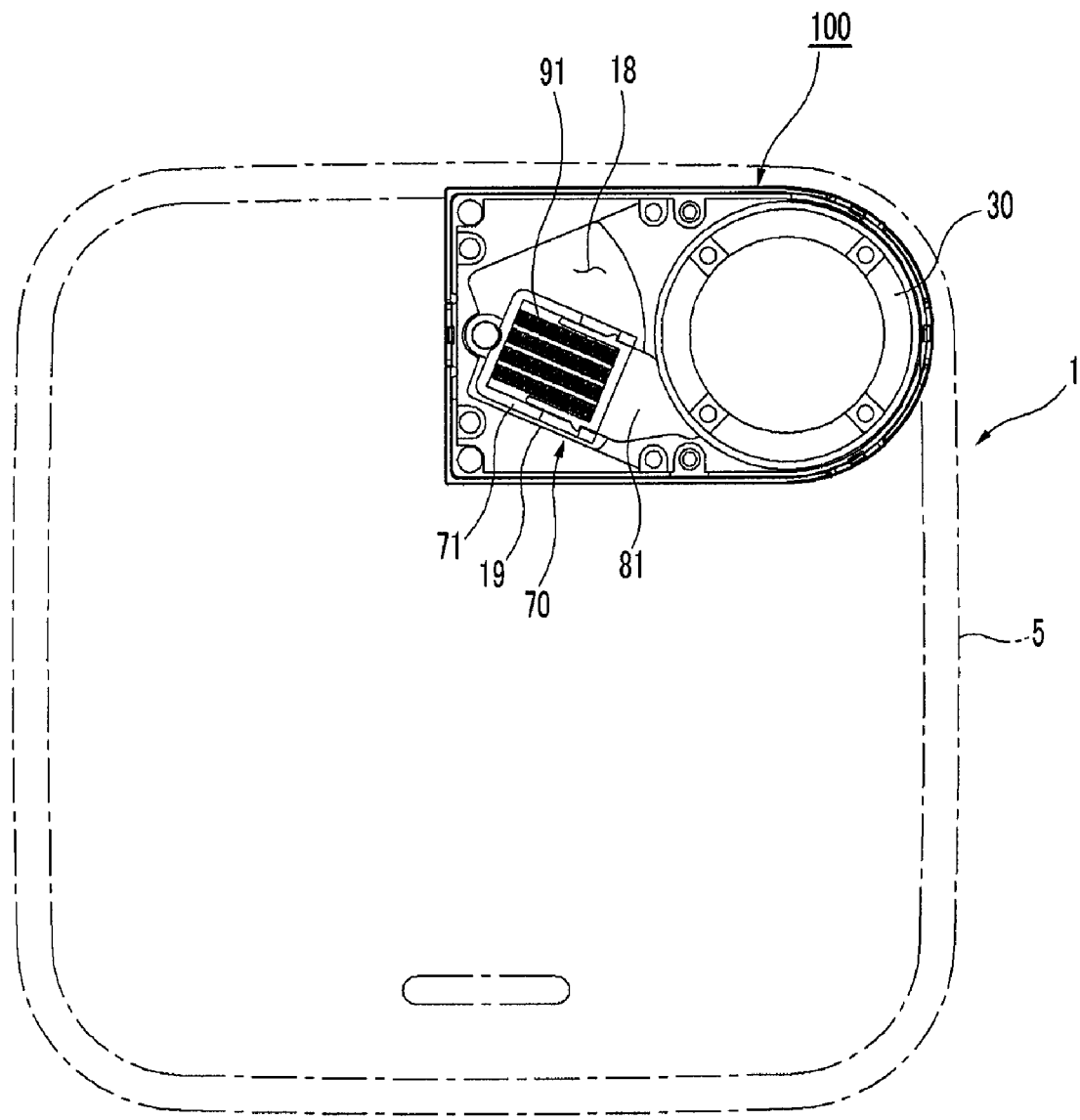
FIG. 1 is a diagram illustrating an example of a portable terminal adopting a swing-type cover opening and closing device according to an exemplary embodiment of the invention.
Figure 2:
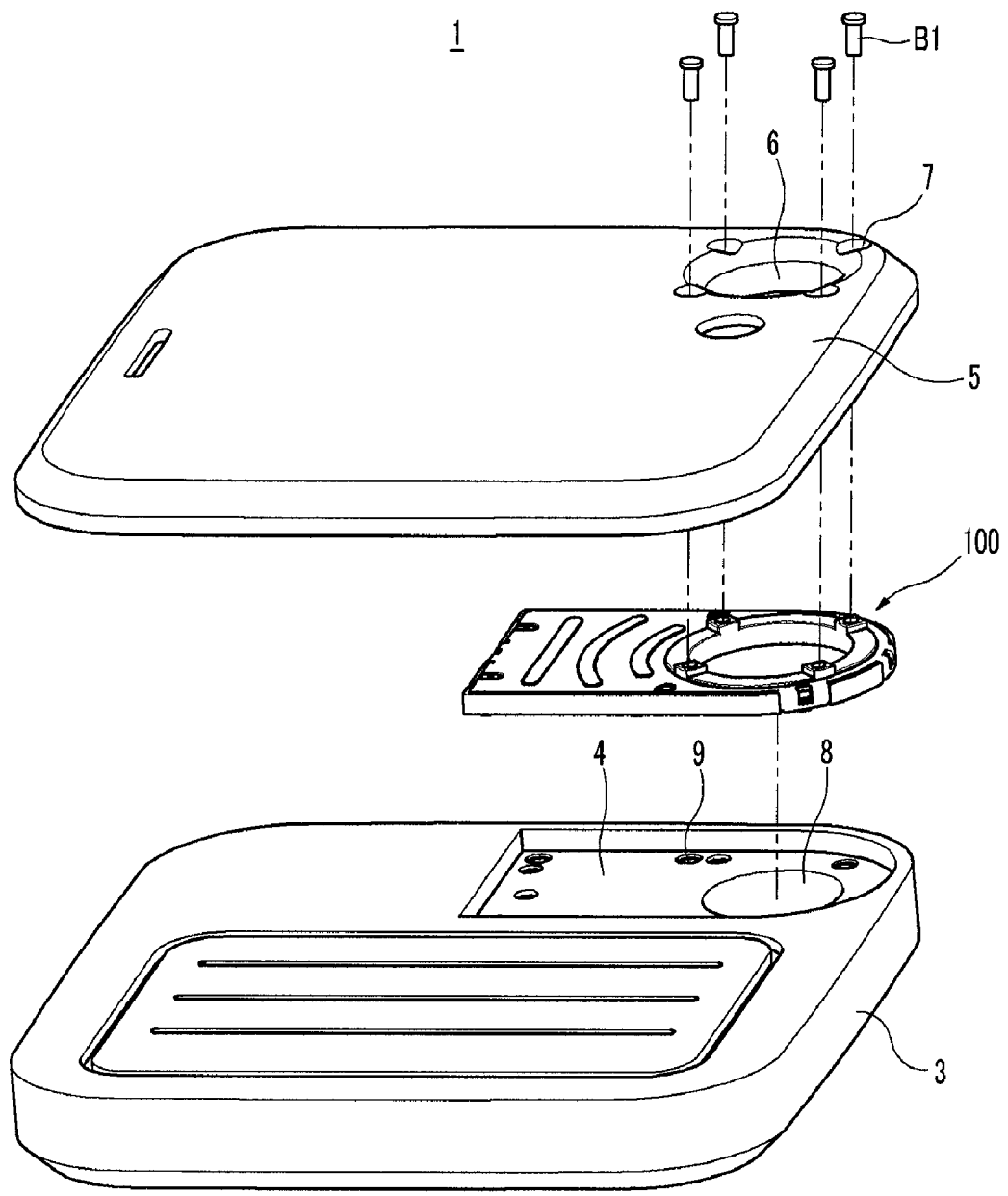
FIG. 2 is an exploded perspective view of a portable terminal adopting a swing-type cover opening and closing device according to an exemplary embodiment of the invention.

FIG. 1 is a diagram illustrating an example of a portable terminal adopting a swing-type cover opening and closing device according to an exemplary embodiment of the invention, and FIG. 2 is an exploded perspective view of FIG. 1.

Referring to the figures, a portable terminal 1 adopting the swing-type cover opening and closing device 100 according to the present exemplary embodiment of the invention includes a mobile phone that includes a main body case 3 (hereinafter referred to as "main body" for convenience) with a keypad, etc., and a cover case 5 (hereinafter referred to as "cover" for convenience) with a display unit, etc., as an example.

The portable terminal 1 has a structure in which the cover 5 can pivot in a clockwise or counterclockwise direction on a predetermined pivot trajectory by the swing-type cover opening and closing device 100 according to the exemplary embodiment.

The portable terminal 1 includes the main body 3 and the cover 5 each having a substantially square shape. A hollow shaft 6 is formed at an upper edge on a front surface (a surface of a standing cover) of the cover 5 to project rearward.

A mount 4 for mounting the swing-type cover opening and closing device 100 according to the present exemplary embodiment is formed at an edge of the main body 3 corresponding to the hollow shaft 6 of the cover 5.

The mount 4 is composed of a slit joined to the swing-type cover opening and closing device 100 and a support groove 8 pivotably supporting the hollow shaft 6 of the cover 5 is formed on the bottom surface of the mount 4.

Herein, a plurality of first and second locking holes 7 and 9 in which locking members B1 and B2 (refer to FIG. 3) such as bolts and rivets can be locked are formed on the periphery of the hollow shaft 6 and the bottom surface of the mount 4, respectively, on the basis of a front surface of the cover 5.

The swing-type cover opening and closing device 100 according to the exemplary embodiment of the invention is not particularly limited to the above-described mobile phone, and may be adopted in various portable terminals such as a PDA, a PMP, a DMB, etc.

Figure 3:
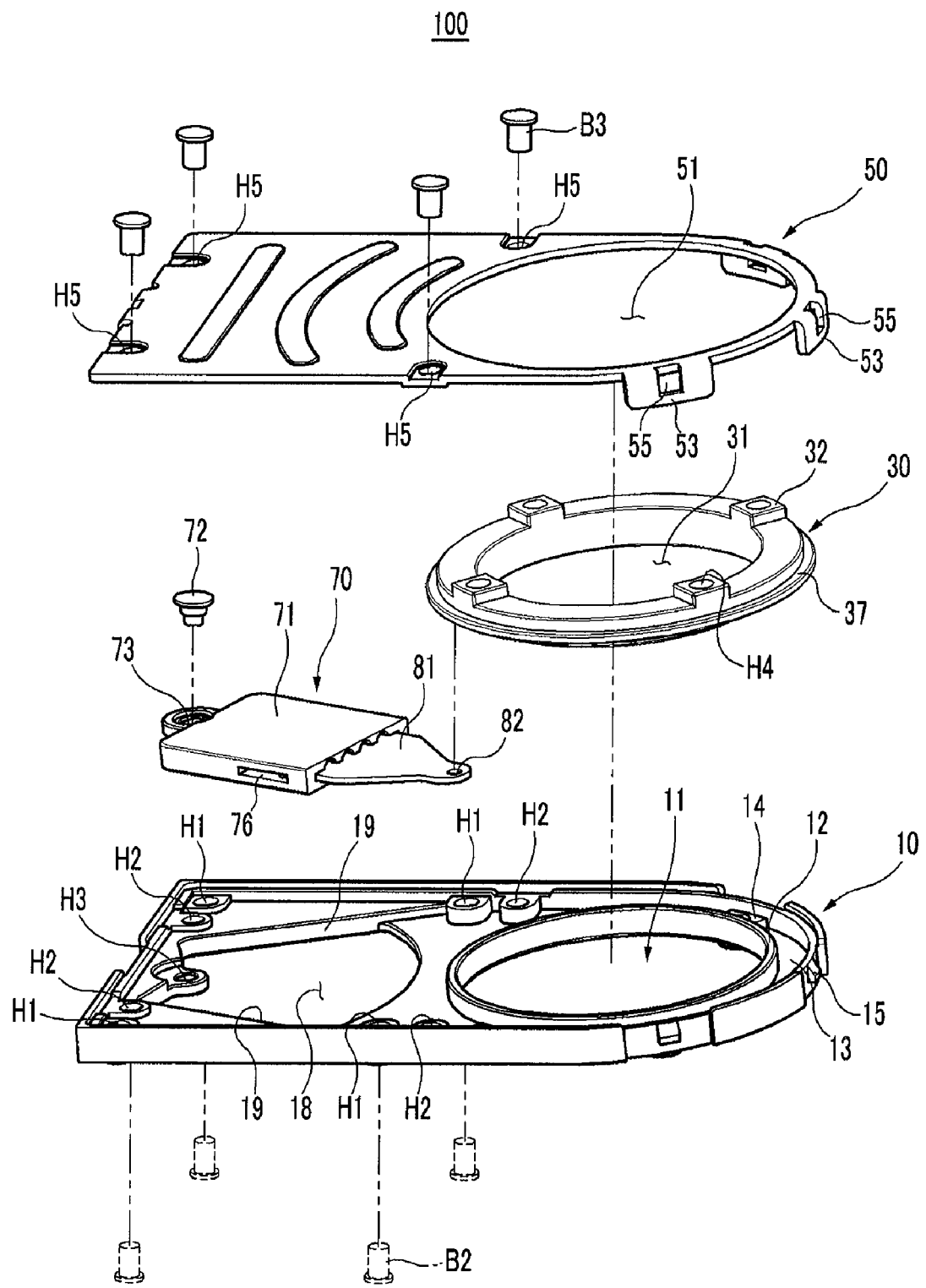
FIG. 3 is an exploded perspective view of a swing-type cover opening and closing device for a mobile phone according to an exemplary embodiment of the invention.
Figure 4:
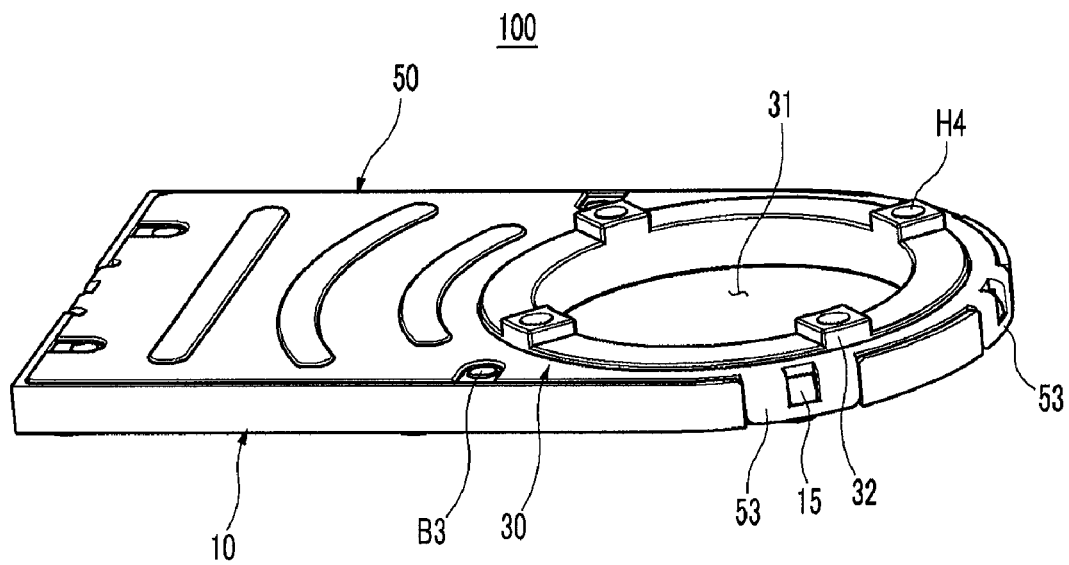
FIG. 4 is an assembly perspective view of a swing-type cover opening and closing device for a mobile phone according to an exemplary embodiment of the invention.
Figure 5:
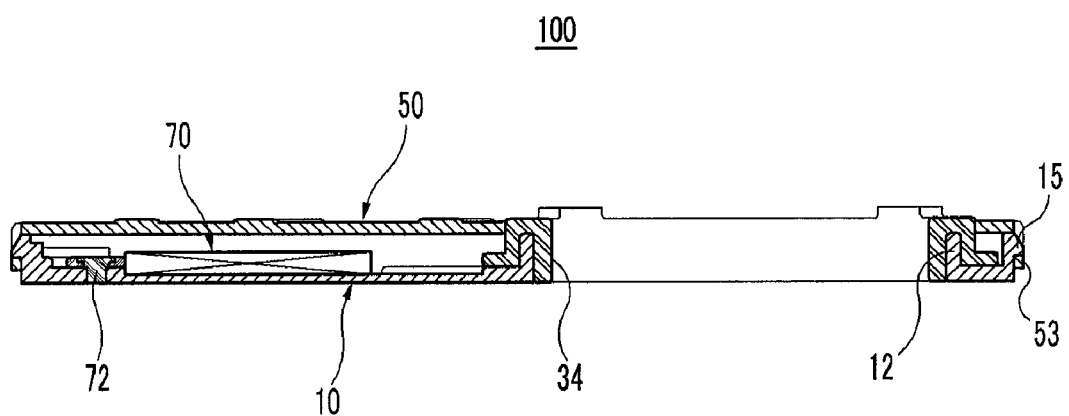
FIG. 5 is a cross-sectional view of a swing-type cover opening and closing device for a mobile phone according to an exemplary embodiment of the invention.

FIG. 3 is an exploded perspective view of a swing-type cover opening and closing device for a mobile phone according to an exemplary embodiment of the invention, FIG. 4 is an assembly perspective view of FIG. 3, and FIG. 5 is a cross-sectional view of FIG. 4.

Referring to the above-described drawings in addition to FIGS. 1 and 2, the swing-type cover opening and closing device 100 for the mobile phone includes components that have improved durability, that enable the cover 5 to be smoothly and stably opened and closed, that allow the cover 5 to pivot in a semi-automated mode, and that implement the slimness and weight reduction of the mobile phone 1 in a simple structure.

The swing-type cover opening and closing device 100 for the mobile phone basically includes a fixation plate 10, a rotating body 30, a cover member 50, and an elastic unit 70. Hereinafter, each of the components will be described in detail.

In the present exemplary embodiment, the fixation plate 10 is installed to be fixed to an upper edge on the front surface (a surface of a standing main body) of the main body 3 in correspondence with the hollow shaft 6 of the cover 5.

The fixation plate 10 is joined to the mount 4 of the main body 3. A through-hole 11 connected with a support groove 8 of the mount 4 is formed on the fixation plate 10.

Herein, the through-hole 11 is composed of a circular hole that the hollow shaft 6 of the cover 5 penetrates and is supported by the support groove 8 of the mount 4.

A plurality of third locking holes H1 in which the locking members B2 such as the bolts and the rivets can be locked through the second locking holes 9 of the mount 4 are formed on the periphery of the fixation plate 10.

Further, a plurality of fourth locking holes H2 for fixing the cover member 50 to be described in detail through the locking members B3 such as the bolts and rivets are formed on the periphery of the fixation plate 10.

Moreover, a joining hole H3 for pivotably joining one end of the elastic unit 70 to be described in detail is formed on the fixation plate 10.

The fixation plate 10 further includes a ring-shaped protrusion 12 that is integrally formed on the periphery of the through-hole 11 to project in a circumferential direction.

The ring-shaped protrusion 12 is formed to project on the top surface of the fixation plate 10 with a predetermined width. The ring-shaped protrusion 12 serves to pivotably support the rotating body 30 to be described in detail.

Moreover, a circular rail part 13 forming a pivot trajectory of 90 degrees or more and preferably a pivot trajectory of 90 degrees or more to the outside of the ring-shape protrusion 12 is formed on the fixation plate 10. Protrusion-type projections 14 are formed at both ends of the rail part 13, respectively.

In the present exemplary embodiment, the rotating body 30 is pivotably joined to the ring-shaped protrusion 12 of the fixation plate 10 and the overall exterior shape of the rotating body 30 is formed of a disk shape having a hollow space 31.

The hollow shaft 6 of the cover 5 fits in the hollow space 31, and the rotating body 30 is joined to the cover 5 through the locking member B1 in a state in which the rotating body 30 is supported on the support groove 8 of the main body 3 by penetrating the through-hole 11 of the fixation plate 10.

The rotating body 30 is pivotably joined to the ring-shaped protrusion 12 of the fixation plate 10. A plurality of locking portions 32 are formed on the top surface of the rotating body 30 according to the present exemplary embodiment, and a circular joining groove 33 (refer to FIG. 6) is formed on the bottom surface of the rotating body 30 in order to join the rotating body 30 to the cover 5.

Each of the locking portions 32 is formed to project on the top surface of the rotating body 30 as a protrusion shape by a predetermined interval.

A fifth locking hole H4 to which an end of the first locking member B1 passing through the first locking hole 7 of the cover 5 can be locked is formed in each locking portion 32.

The fifth locking hole H4 is interconnected with the joining groove 33. In the present exemplary embodiment, it is not necessarily limited to forming the hole-shaped fifth locking hole H4 in the locking portion 32, and a locking groove that does not penetrate the joining hole 33 may be formed.

Figure 6:
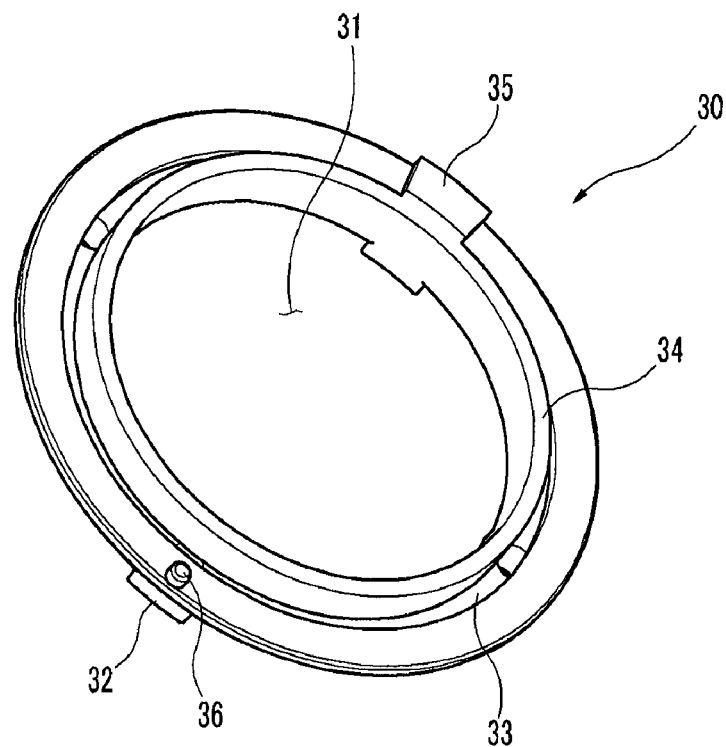
FIG. 6 is a perspective view illustrating a bottom surface of a pivoting body adopted in a swing-type cover opening and closing device for a mobile phone according to another exemplary embodiment of the invention.

As shown in FIG. 6, the joining hole 33 is formed on the bottom surface of the rotating body 30 in correspondence with the ring-shaped protrusion 12 of the fixation plate 10, and is formed on the outer periphery of the hollow space 31 in the circumferential direction of the hollow space 31.

In this case, the joining groove 33 is joined to the ring-shaped protrusion 12 of the fixation plate 10 and is composed of a slit constituting a predetermined gap with respect to the ring-shaped protrusion 12.

A support protrusion 34 for supporting the inner peripheral surface of the ring-shaped protrusion 12 is formed in the rotating body 30 in a state in which the rotating body 30 is pivotably mounted on the ring-shaped protrusion 12 of the fixation plate 10 through the joining groove 33.

Herein, the support protrusion 34 is composed of an inner wall (that is, a hollow inner wall) of the joining groove 33. The support protrusion 34 has a width that is larger than a depth of the joining groove 33, and is formed to project downward from the upper portion of the rotating body 30.

A protrusion-shaped stopper 35 sliding on the rail part 13 of the fixation plate 10 is integrally formed on the bottom surface of the rotating body 30.

The stopper 35 is joined to the rail part 13 and slides on the rail part 13 by rotation of the rotating body 30 through the cover 5.

When the rotating body 30 pivots, the stopper 35 is suspended on the projections 14 at both ends of the rail part 13 while sliding on the rail part 13, thereby preventing the rotating body 30 from pivoting at a predetermined pivot angle (90 degrees) or more.

Further, a hinge protrusion 36 for pivotably joining the other end of the elastic unit 70 described below is formed on the bottom surface of the rotating body 30.

In the present exemplary embodiment, the cover member 50 serves to support the outer periphery of the rotating body 30 so as to prevent the rotating body 30 from being separated from the fixation plate 10.

The cover member 50 has a support hole 51 corresponding to the hollow space 31 of the rotating body 30 to support the outer periphery of the rotating body 30 and is locked to the fixation plate 10 through the locking member B3.

The cover member 50 supports the outer periphery of the rotating body 30 through the periphery of the support hole 51 while covering the top surface of the fixation plate 10 by forming a stepped surface 37 on the outer periphery of the rotating body 30.

The stepped surface 37 is formed in the circumferential direction of the rotating body 30 as a width corresponding to the periphery of the support hole 51.

A plurality of sixth locking holes H5 corresponding to the fourth locking holes H2 of the fixation plate 10 are formed on the periphery of the cover member 50 in order to lock the above-mentioned locking member B3.

Accordingly, the locking member B3 is locked to the fourth locking holes H2 of the fixation plate 10 through the sixth locking holes H5 of the cover member 50, such that the cover member 50 is joined to the fixation plate 10 while supporting the outer periphery of the rotating body 30 through the periphery of the support hole 51.

Further, a plurality of hooks 53 are formed on the periphery of the cover member 50 in order to reinforce the joining force to the fixation plate 10.

Each of the hooks 53 is integrally formed in the cover member 50. Each hook 53 is bent to the periphery of the fixation plate 10, and hook holes 55 are formed in the hooks 53.

Meanwhile, hook protrusions 15 that can be joined to the hook holes 55 of the hook 53 are formed on the periphery of the fixation plate 10 in correspondence with the hooks 53 of the cover member 50.

In the present exemplary embodiment, the elastic unit 70 serves to provide elastic force to the rotating body 30 by rotation of the rotating body 30 through the cover 5 of the portable terminal 1.

That is, as a user applies force to the cover 5 until the cover 5 pivots in a predetermined section, the elastic unit 70 allows the elastic force to be provided to the rotating body 30 that pivots together with the cover 5 and allows the cover 5 to automatically pivot by the elastic force in the other section.

Both ends of the elastic unit 70 are pivotably joined to the joining hole H3 of the fixation plate 10 and the hinge protrusion 36 of the rotating body 30, respectively.

Figure 7:
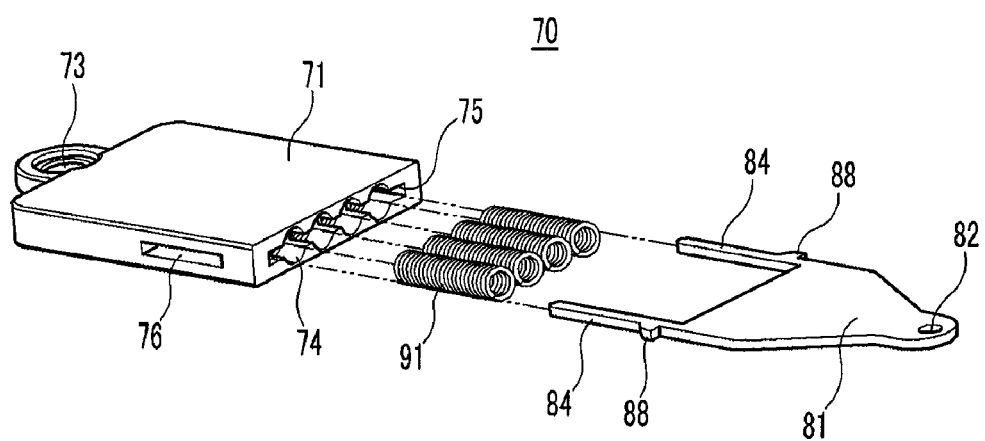
FIG. 7 is an exploded perspective view illustrating the configuration of an elastic unit adopted in a swing-type cover opening and closing device for a mobile phone according to an exemplary embodiment of the invention.

As shown in FIG. 7, the elastic unit 70 includes a housing 71, a slide member 81, and a plurality of spring members 91.

Herein, the housing 71 is pivotably joined to the fixation plate 10. The slide member 81 is joined to the inside of the housing 71 to be slidable and lockable while being pivotably connected to the bottom surface of the rotating body 30. The spring members 91 are installed in the housing 71.

Hereinafter, the components of the elastic unit 70 will be described in detail. First, the housing 71 has a plate shape and is pivotably installed in the joining hole H3 of the fixation plate 10 through a hinge pin 72.

A first hinge hole 73 to which the hinge pin 72 can be joined through the joining hole H3 of the fixation plate 10 is formed at one end of the housing 71.

In the present exemplary embodiment, the housing 71 is pivotably installed while forming a trajectory of 90 degrees around a hinge point positioned on the same line as the center of the hollow space 31 of the rotating body 30, i.e., a point at which the hinge pin 72 fits in a state in which the joining hole H3 of the fixation plate 10 and the first hinge hole 73 coincide with each other.

A plurality of spring mounting grooves 74 for mounting the spring members 91 are successively formed to the inside from the other end of the housing 71 in a width direction.

Preferably, the spring mounting grooves 74 are formed at four locations at predetermined intervals in the width direction in the housing 71.

Further, guide grooves 75 to which the slide member 81 can be joined while being interconnected to the spring mounting grooves 74 are formed in the housing 71.

The guide grooves 75 are interconnected with the spring mounting grooves 74 in the width direction of the housing 71 and extend to both side parts of the housing 71.

Furthermore, slit-type locking holes 76 connected to the guide grooves 75 are formed on both sides of the housing 71.

In the present exemplary embodiment, the slide member 81 has the plate shape to be inserted into the guide grooves 75 from the other end of the housing 71.

In a state in which the slide member 81 is mounted to the guide grooves 75 and the locking holes 76 of the housing 71 to be slidable and lockable, respectively, the end of the slide member 81 is hinge joined to the hinge protrusion 36 of the rotating body 30.

A second hinge hole 82 joined to the hinge protrusion 36 is formed at the end of the slide member 81 that corresponds to the rotating body 30.

A pair of support pins 84 that fit in each of the spring members 91 mounted in the spring mounting grooves 74 at both sides of the housing 71 are integrally formed in the slide member 81.

Herein, a locking protrusion 88 that can be locked in the locking hole 76 by the elastic force of the spring member 91 applied to the slide member 81 is formed in each of the support pins 84 by being fitted in the locking hole 76 of the housing 71.

As described above, each of the spring members 91 serves to apply the elastic force to the slide member 81 while fitting in the spring mounting groove 74 of the housing 71.

It is preferable that the spring member 91 is composed of a compression coil spring in the present exemplary embodiment.

Meanwhile, a mounting hole 18 corresponding to the pivot trajectory of the housing 71 is formed in the fixation plate 10 according to the present exemplary embodiment in correspondence with the housing 71 of the elastic unit 70.

That is, the mounting hole 18 is formed by cutting a part of the fixation plate 10 corresponding to the pivot trajectory of the housing 71. Therefore, the housing 71 pivots while forming the pivot trajectory of 90 degrees in an internal area of the mounting hole 18.

As described above, a reason why the mounting hole 18 corresponding to the pivot trajectory of the housing 71 is formed in the fixation plate 10 is to decrease the thickness of the fixation plate 10 by as much as the thickness of the housing 71.

Accordingly, in the present exemplary embodiment, the thickness of the fixation plate 10 can be reduced by the mounting hole 18 such that the overall thickness of the device 100 is reduced. Ultimately, it is possible to achieve the slimness and weight reduction of the portable terminal 1.

On the other hand, the fixation plate 10 according to the present exemplary embodiment further includes an auxiliary stopper 19 for auxiliarily controlling the predetermined pivot angle (90 degrees) of the rotating body 30.

Such an auxiliary stopper 19 serves to assist a function of the above-described stopper 35 and is composed of both hole ends of the mounting hole 18.

Hereinafter, an assembly sequence and an operation process of the swing-type cover opening and closing device 100 for the mobile phone according to the exemplary embodiment of the invention will be described in detail.

The assembly sequence of the swing-type cover opening and closing device 100 for the mobile phone according to the present exemplary embodiment of the invention will now be described. First, in the present exemplary embodiment, the elastic unit 70 is mounted on the fixation plate 10, and the hinge pin 72 fits in the first hinge hole 73 and the joining hole H3 in a state in which the first hinge hole 73 of the housing 71 and the joining hole H3 of the fixation plate 10 coincide with each other.

At this time, the housing 71 of the elastic unit 70 is pivotable in the internal area of the mounting hole 18 on the trajectory of the predetermined angle (90 degrees) around the hinge pin 72 while being positioned in the internal area of the mounting hole 18 of the fixation plate 10.

Accordingly, in the present exemplary embodiment, the thickness of the fixation plate 10 of as much as the thickness of the housing 71 can be reduced by mounting the housing 71 of the elastic unit 70 in the mounting hole 18, such that the overall thickness of the device 100 is reduced. As a result, it is possible to achieve the slimness and weight reduction of the portable terminal 1.

Next, the rotating body 30 is pivotably mounted on the ring-shaped protrusion 12 of the fixation plate 10 through the joining hole 33 of the rotating body 30.

Herein, the rotating body 30 can be pivotably mounted on the ring-shaped protrusion 12 while supporting the inner peripheral surface of the ring-shaped protrusion 12 through the support protrusion 34.

In this process, in the present exemplary embodiment, the stopper 35 of the rotating body 30 is positioned in the rail part 13 of the fixation plate 10 and the hinge protrusion 36 of the rotating body 30 is joined to the second hinge hole 82 of the slide member 81.

Subsequently, the top surface of the fixation plate 10 is covered with the cover member 50. In a state in which the sixth locking holes H5 of the cover member 50 and the fourth locking holes H2 of the fixation plate 10 coincide with each other, the hooks 53 of the cover member 50 are joined to the hook protrusion 15 of the fixation plate 10.

At this time, the cover member 50 supports the periphery of the rotating body 30 while the periphery of the support hole 51 is smoothly seated on the stepped surface 37 of the rotating body 30.

Lastly, when the locking members B3 such as the bolts and the rivets are locked to the fourth locking holes H2 through the sixth locking holes H5, the assembly of the swing-type cover opening and closing device 100 for the mobile phone according to the present exemplary embodiment is completed.

The swing-type cover opening and closing device 100 for the mobile phone according to the present exemplary embodiment, which is assembled as described above, is mounted on the main body 3 and the cover 5 of the portable terminal 1. In the mounting process, the device 100 firstly fits in the mount 4 of the main body 3 of the portable terminal 1 in the present exemplary embodiment.

Therefore, the hollow space 31 of the rotating body 30 naturally coincides with the support groove 8 of the mount 4, and the second locking holes 9 of the mount 4 and the third locking holes H1 of the fixation plate 10 also coincide with each other.

In this state, when the locking members B2 are locked to the third locking holes H1 through the second locking holes 9, the device 100 is firmly fixed to the mount 4 of the main body 3.

After the above-mentioned process, the hollow shaft 6 of the cover 5 fits in the hollow space 31 of the rotating body 30. At this time, the hollow shaft 6 is supported on the support groove 8 of the mount 4 by passing through the through-hole 11 of the fixation plate 10.

Lastly, when the locking members B1 are locked to the locking portions 32 through the first locking holes 7 in a state in which the first locking holes 7 of the cover 5 coincide with the locking portions 32 of the rotating body 30, the cover 5 is fixed to the rotating body 30. As a result, mounting the swing-type cover opening and closing device 100 according to the present exemplary embodiment on the portable terminal 1 is completed.

Hereinafter, the operation process of the swing-type cover opening and closing device 100 for the mobile phone according to an exemplary embodiment of the invention, which is disposed in the portable terminal 1, will be described in detail with reference to the above-mentioned drawings and the below-mentioned drawings.

First, as shown in FIG. 1, in case in which the cover 5 is completely closed to the main body 3 of the portable terminal 1, the elastic unit 70 slants with respect to a pivotal direction of the cover 5.

Herein, a comparatively small elastic force acts on the spring member 91 of the elastic unit 70 by the rotating body 30.

At this time, the stopper 35 of the rotating body 30 is suspended on the one projection 14 of the rail part 13.

The housing 71 of the elastic unit 70 is stopped in the auxiliary stopper 19 of the fixation plate 10, i.e., one hole end of the mounting hole 18.

Figure 8:
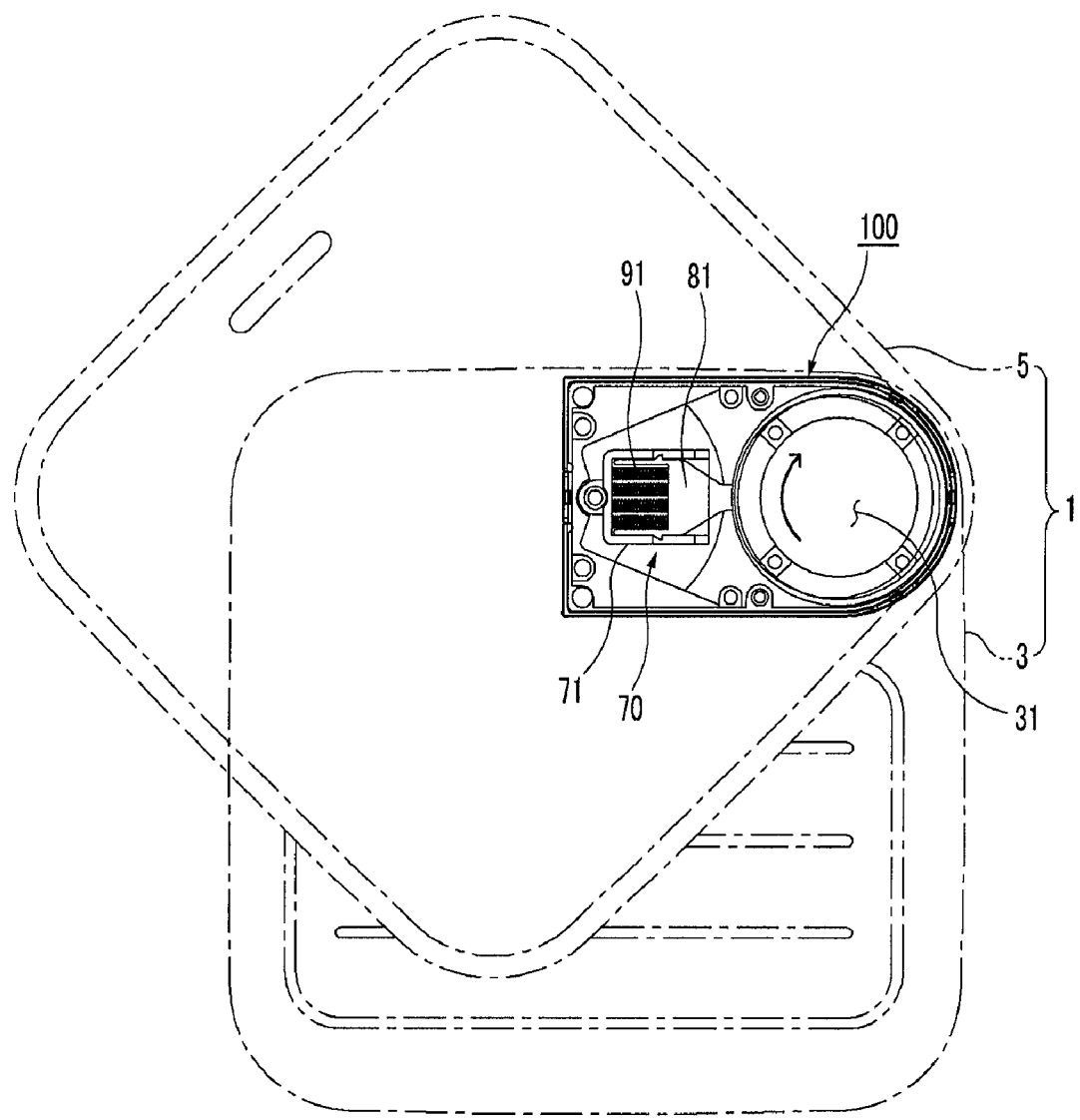
FIG. 8 is a plan view illustrating a state in which a cover of a mobile phone is opened at 90 degrees in a swing-type cover opening and closing device for a mobile phone according to an exemplary embodiment of the invention.

In this state, when the pivotal force is applied to the cover 5 in the clockwise direction as shown in FIG. 8, the cover 5 starts to pivot together with the rotating body 30 while being supported on the mount 4 of the main body 3 around the hollow shaft of the cover 5.

In this process, when the cover 5 pivots until the cover 5 opens approximately in half (approximately 90 degrees) from the main body 3, the rotating body 30 pivots by approximately 45 degrees in the clockwise direction.

That is, the rotating body 30 pivots in the clockwise direction while being supported on the ring-shaped protrusion 12 of the fixation plate 10 while the stopper 35 slides on the rail part 13 of the fixation plate 10.

In the process, since the housing 71 and the slide member 81 of the housing 70 are hinge-joined to the fixation plate 10 and the rotating body 30, respectively, the elastic unit 70 pivots in the counterclockwise direction opposite to the pivotal direction of the rotating body 30 around the hinge point between the fixation plate 10 and the rotating body 30.

In a state in which the rotating body 30 pivots by approximately 45 degrees in the counterclockwise direction, the elastic unit 70 is positioned on the same line (vertex) as the center of the hollow space 31 of the rotating body 30.

Accordingly, as described above, since the elastic unit 70 pivots together with the rotating body 30, the slide member 81 of the elastic unit 70 compresses the spring member 91 to the maximum and the spring member 91 applies elastic restoration force to the rotating body 30 through the slide member 81.

Figure 9:
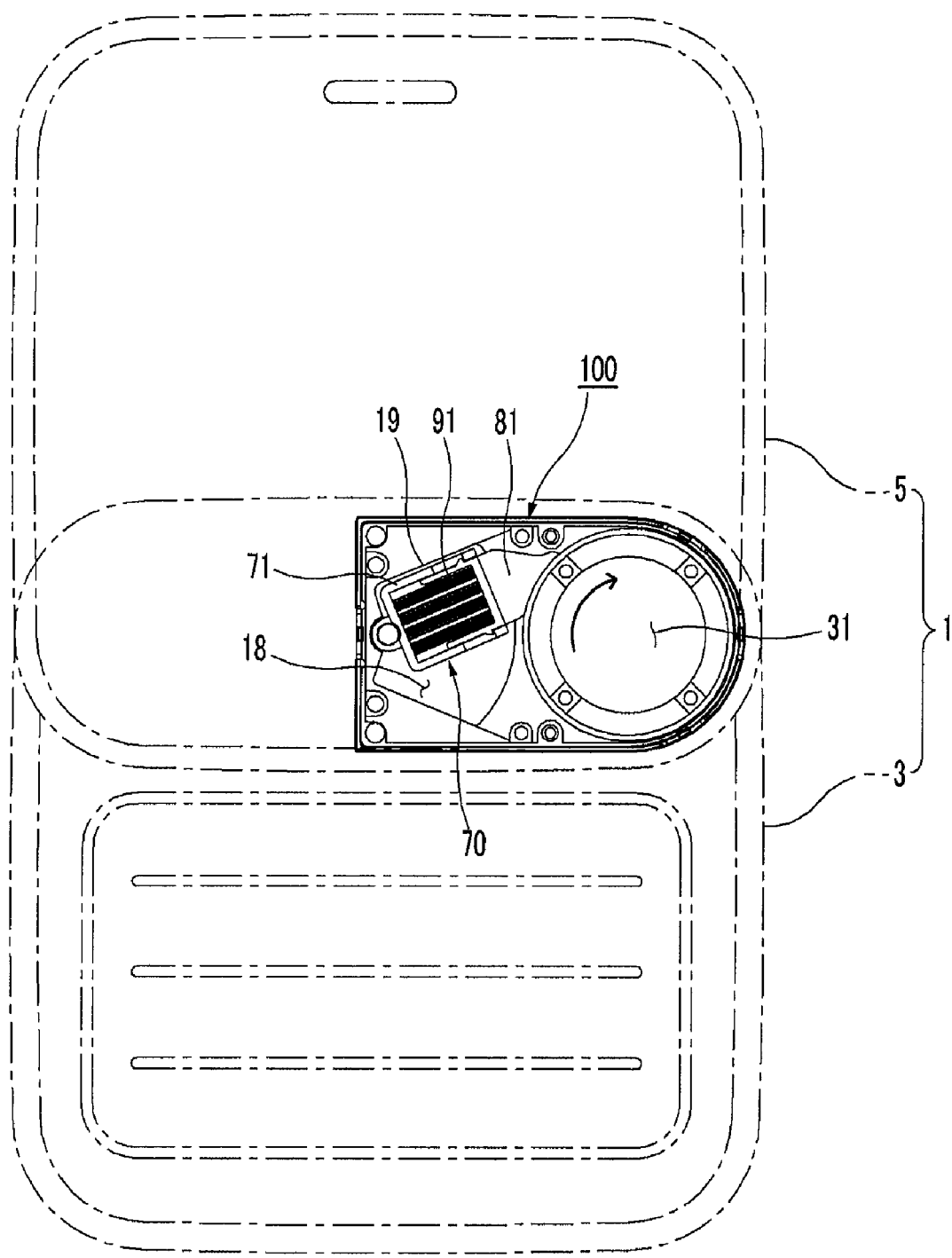
FIG. 9 is a plan view illustrating a state in which a cover of a mobile phone is opened at 180 degrees in a swing-type cover opening and closing device for a mobile phone according to an exemplary embodiment of the invention.

Thereafter, when the user continuously applies the pivotal force to the cover 5, the rotating body 30 pivots automatically in the clockwise direction by the elastic restoration force of the spring member 91 provided to the slide member 81 even if the user does not apply the pivotal force to the cover 5 any longer at the moment in which the elastic unit 70 travels on the same line as the center of the hollow space 31 as shown in FIG. 9.

Herein, the rotating body 30 pivots in the clockwise direction while the stopper 35 slides on the rail part 13 of the fixation plate 10. The stopper 35 pivots by 45 degrees while being suspended on the other projection 14 of the rail part 13.

In this process, while the elastic unit 70 pivots together with the rotating body 30, the housing 71 of the elastic unit 70 is stopped in the auxiliary stopper 19 of the fixation plate 10, i.e., the other hole end of the mounting hole 18. Further, the elastic force of the spring member 91 is loosened or released while the spring member 91 is restored, similar to when the cover 5 is closed.

Accordingly, in the present exemplary embodiment, since the rotating body 30 pivots by 90 degrees by the above-mentioned operation, the cover 5 of the portable terminal 1 is fully opened while pivoting by 180 degrees from the main body 3.

As described above, a reason why the cover 5 pivots by 180 degrees while the rotating body 30 pivots by 90 degrees is that the main body 3 and the cover 5 of the portable terminal 1 have the square shape and the swing-type cover opening and closing device 100 according to the present exemplary embodiment is disposed at edges of the main body 3 and the cover 5 between the main body 3 and the cover 5.

Meanwhile, when the cover 5 is again closed in a state in which the cover 5 is fully opened, the cover 5 is full closed while each component operates in a reverse sequence to the opening operation of the cover 5 by applying the force to the cover 5 in the counterclockwise direction.

Therefore, in the present exemplary embodiment, unlike the related art of a surface contact-type using a cam structure, since the rotating body 30 that is pivotably supported on the fixation plate 10, the fixation plate of the rotating body 30, and the ring-shaped elastic unit 70 that is hinge-joined to the rotating body 30 are provided in the device 100, the durability is improved and the cover 5 can be opened more smoothly and stably in the simple structure.

Further, in the present exemplary embodiment, since the fixation plate 10 and the rotating body 30 have the plate shape and the mounting hole 18 for mounting the elastic unit 70 is formed in the fixation plate 10, the overall thickness of the device 100 is reduced. As a result, it is advantageous to make the portable terminal 1 slim and light.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A swing-type cover opening and closing device for a mobile phone, in which the mobile phone is composed of a main body and a cover and where a hollow shaft formed in the cover is pivotably supported on the main body to pivot the cover in a clockwise or counterclockwise direction around the hollow shaft, the device comprising:
    a fixation plate that is fixed to one side of the main body in correspondence with the hollow shaft, and includes a through-hole through which the hollow shaft passes and a ring-shaped protrusion integrally formed on the periphery of the through-hole;
    a rotating body that has a disk shape with a hollow space, is pivotably joined to the ring-shaped protrusion, and is locked to the cover with the hollow shaft fitting in the hollow space;
    a cover member that includes a support hole corresponding to the hollow space and is joined to the fixation plate while supporting the outer periphery of the rotating body through the support hole; and
    an elastic unit of which both ends are pivotably joined to the fixation plate and the rotating body, respectively, to provide elastic force to the rotating body by rotation of the rotating body through the cover.

2. The swing-type cover opening and closing device of claim 1, wherein a plurality of locking portions to which a locking member passing through the cover can be locked are formed on the top surface of the rotating body and a joining groove joined to the ring-shaped protrusion is formed on the bottom surface of the rotating body.

3. The swing-type cover opening and closing device of claim 2, wherein the rotating body includes a support protrusion that substantially supports the inner peripheral surface of the ring-shaped protrusion, and the support protrusion is composed of an inner wall of the joining groove and has a width that is larger than a depth of the joining groove.

4. The swing-type cover opening and closing device of claim 1, wherein a circular rail part forming a trajectory of 90 degrees or more in correspondence with the rotating body is formed on the fixation plate and projections are formed at both ends of the rail part, respectively, and a protrusion-shaped stopper sliding on the rail part is integrally formed on the bottom surface of the rotating body.

5. The swing-type cover opening and closing device of claim 1, wherein the cover member is joined to the fixation plate through the locking member and at least one hook for reinforcing joining force to the fixation plate is formed on the periphery of the cover member, and a hook protrusion joined to the hook in correspondence with the hook is formed on the periphery of the fixation plate.

6. The swing-type cover opening and closing device of claim 1, wherein the elastic unit includes:
    a housing that is pivotably installed on the fixation plate through a hinge pin;
    a slide member that is pivotably connected to the bottom surface of the rotating body and is joined to the inside of the housing to be slidable and lockable; and
    a plurality of spring members that are installed in the housing to apply the elastic force to the slide member.

7. The swing-type cover opening and closing device of claim 6, wherein a mounting hole corresponding to a pivot trajectory of the housing is formed on the fixation plate to penetrate therethrough.

8. The swing-type cover opening and closing device of claim 7, wherein the fixation plate further includes an auxiliary stopper for controlling a predetermined pivot angle of the rotating body, and the auxiliary stopper is composed of both hole ends of the mounting hole.

9. The swing-type cover opening and closing device of claim 6, wherein the housing has a plate shape, a plurality of spring mounting grooves for mounting for the spring members are successively formed in a width direction thereof, a guide groove is joined to the slide member while being connected to the spring mounting grooves, and slit-shaped locking holes connected to the guide grooves are formed at both sides of the guide grooves.

10. The swing-type cover opening and closing device of claim 9, wherein the slide member has the plate shape to fit in the guide groove and integrally includes a pair of support pins that fit in the spring member mounted on the spring mounting grooves at both sides of the housing, and a locking protrusion joined to the locking hole is formed in each support pin.

11. The swing-type cover opening and closing device of claim 1, wherein a hinge protrusion that is hinge-joined to the slide member is formed on the bottom surface of the rotating body, and a hinge hole joined to the hinge protrusion is formed in the slide member.

12. The swing-type cover opening and closing device of claim 1, wherein the hinge hole for joining the hinge pin is formed in the housing.

13. The swing-type cover opening and closing device of claim 1, wherein the swing-type cover opening and closing device is installed in the mobile phone that includes the main body and the cover that have a square shape, and is mounted at edges of the main body and the cover between the main body and the cover, and the rotating body forms a pivot trajectory of 90 degrees to pivot the cover by 180 degrees in the clockwise or counterclockwise direction.

* * * * *